(12) United States Patent
Core

(10) Patent No.: US 6,922,739 B2
(45) Date of Patent: Jul. 26, 2005

(54) SYSTEM AND METHOD FOR DUAL IDE CHANNEL SERVICING USING SINGLE MULTIPLEXED INTERFACE HAVING FIRST AND SECOND CHANNEL TRANSFER OVER A COMMON BUS

(75) Inventor: Mark Core, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 99 days.

(21) Appl. No.: 10/409,870

(22) Filed: Apr. 9, 2003

(65) Prior Publication Data

US 2004/0167998 A1 Aug. 26, 2004

Related U.S. Application Data

(60) Provisional application No. 60/449,924, filed on Feb. 24, 2003.

(51) Int. Cl.[7] ............................................. G06F 13/28
(52) U.S. Cl. ............................. 710/22; 710/20; 710/21; 710/33; 710/5
(58) Field of Search ................................. 710/5, 20–22, 710/33

(56) References Cited

U.S. PATENT DOCUMENTS

| | | | |
|---|---|---|---|
| 5,905,885 A | * | 5/1999 | Richter et al. .................. 710/5 |
| 6,697,867 B1 | * | 2/2004 | Chong, Jr. .................. 709/229 |
| 6,845,409 B1 | * | 1/2005 | Talagala et al. .............. 710/20 |
| 2003/0074515 A1 | * | 4/2003 | Resnick ....................... 710/313 |

* cited by examiner

*Primary Examiner*—Tammara Peyton
(74) *Attorney, Agent, or Firm*—Garlick Harrison & Markison LLP

(57) ABSTRACT

An integrated receiver with dual channel transport stream decoding and delivery substantially implemented on a single CMOS integrated circuit is described. For multiple channel transfers to hard disk drive storage, a multiplexed IDE host interface is provided with shared pins for data, address, and chip-select lines of the IDE interface so that multiple hard drives may be interfaced using the common pins of the integrated circuit.

17 Claims, 8 Drawing Sheets

SYSTEM AND METHOD FOR DUAL IDE CHANNEL SERVICING USING SINGLE MULTIPLEXED INTERFACE HAVING FIRST AND SECOND CHANNEL TRANSFER OVER A COMMON BUS

RELATED APPLICATIONS

This application claims priority to the U.S. Provisional Application No. 60/449,924, entitled "Dual IDE Channel Servicing Using Single Multiplexed Interface," which was filed on Feb. 24, 2003 and which is incorporated herein by reference in its entirety.

BACKGROUND OF THE INVENTION

1. Field of the Invention

The present invention is directed in general to receivers for processing multiple input signals. In one aspect, the present invention relates to a method and system for servicing two satellite signals by multiplexing two fully independent IDE channels over common pin input/outputs. In a further aspect, the present invention provides an integrated circuit system for multiplexing the data, address, and chip select lines of the IDE interface so that twice as many hard drives may be interfaced using the common pins of the integrated circuit.

2. Related Art

In the context of providing for data storage and retrieval, bus interface standards have been developed, such as the Advanced Technology Attachment (ATA) standard interface for hard disk drives that controls the flow of data between the processor and the hard disk. The standard has also been referred to as Integrated Drive Electronics (IDE), and the one following it is called Enhanced Integrated Data Electronics (EIDE). The ATA standard defines a command and register set for the interface, creating a universal standard for communication between the drive unit and the PC. The standard was extended to working with CD-ROMs and tape drives, the extension being known as Advanced Technology Attachment Packet Interface (ATAPI), the full standard now being known as ATA/ATAPI. This standard has evolved through different versions, including AT Attachment with Packet Interface-5. This standard includes new ultra DMA modes to define transfer rates of 44.4 and 66.7 MB/s, and also made mandatory use of an 80-conductor IDE cable for UDMA modes 3 and 4. In addition, proposals have been made for ATA Host Adapter Standards to specify an open host controller interface for ATA host adapters, wherein different types of host adapters, methods for their identification, and the programming interfaces used are defined.

A significant contribution to the overall cost of manufacturing integrated circuits is the pin count. The standard ATA requires at least 27 pins per channel. Under conventional approaches, extra pins are required for each channel, or alternatively, pins are shared during channel storage, such that one channel has exclusive access to the ATA bus until a DMA data transfer is finished, after which time the second channel obtains exclusive access. As a result, the throughput over such a bus will be approximately half of that of the independent 2-channel ATA bus system which provides separate pins for each channel. It is therefore desirable to find a way to regain some of this loss in maximum throughput. It is also desirable to keep pin count to a minimum.

In addition to meeting reduced chip space and pin count requirements, the ever-increasing need for higher speed communications systems imposes additional performance requirements and resulting costs. In order to reduce costs, communications systems are increasingly implemented using Very Large Scale Integration (VLSI) techniques. The level of integration of communications systems is constantly increasing to take advantage of advances in integrated circuit manufacturing technology and the resulting cost reductions. This means that communications systems of higher and higher complexity are being implemented in a smaller and smaller number of integrated circuits. For reasons of cost and density of integration, the preferred technology is CMOS.

Further limitations and disadvantages of conventional systems will become apparent to one of skill in the art after reviewing the remainder of the present application with reference to the drawings and detailed description which follow.

SUMMARY OF THE INVENTION

In accordance with the present invention, an integrated circuit system and method are provided for servicing two satellite programs by providing an IDE host interface that includes a multiplexing I/O interface. This multiplexing I/O interface shares data, address, and chip select pins between the primary and secondary ATA busses. Using this technique, plural independent IDE channels are provided using common pin input/outputs.

In a selected embodiment, a satellite set-top box decoder is provided for servicing multiple independent channels for storage in external storage devices, such as IDE storage devices or hard disk drives. In the decoder, an ATA host adapter includes a bus interface for receiving transfer parameters defining a primary channel transfer to a primary external storage device. The bus interface also receives transfer parameters defining a secondary channel transfer to a secondary external storage device. The ATA host adapter also includes a memory bus interface for receiving data to be transferred under control of the transfer parameters. A DMA controller is also included for supervising the progress of the data transfer, and includes memory for storing transfer parameters and transfer status information for the primary channel transfer until the primary channel transfer is completed. Under supervision of a DMA controller module, an external storage bus interface in the ATA host adapter multiplexes primary and secondary channel data, address, and chip select signals over common pins to take advantage of idle events on the common pins. For example, the data on the common data bus pins switches from primary channel data to the second are channel data at a predetermined switching event, such as when the common pins are idle, or when a request to initiate a second channel transfer is received by the interface controller. The data on the common data bus pins may then be switched back to complete the first channel transfer under control of the DMA controller at a predetermined switching event, such as when the register write commands for the secondary channel transfer have been transmitted to the secondary external storage device. In one embodiment, the ATA host adapter includes an ATA bus interface for transferring ATA control, address and data information for primary and secondary channels over common pins. With the present invention, the external storage bus interface suspends the primary channel transfer when the request to initiate a secondary channel transfer is received, allowing the host to initiate the secondary channel transfer, and then restarts the primary channel transfer. After completion of the primary channel transfer, the secondary channel transfer resumes and is completed.

With an alternative embodiment of the present invention, a method for sending or receiving multiple DMA transfers to or from multiple external storage drives over a common pin set is provided, where each DMA transfer comprises a transfer set-up portion and a data transfer portion. According to the method, a first DMA transfer is initiated over the common pin set to a first external storage device. A request for a second DMA transfer to a second external storage device is also received, where the request may be received before, contemporaneously with or after the first DMA transfer request is received. Once the first DMA transfer has been initiated, the method of the present invention releases the common pin set from the first external storage device upon occurrence of a first predetermined event, and initiates the second DMA transfer over the common pin set to the second external storage device. Examples of a predetermined event include the receipt of the request for a second DMA transfer if received after the first DMA transfer is initiated, or when the first external storage device enters seek mode, or when the common pin set is idle. By terminating or suspending the first DMA transfer when the predetermined event occurs with transfer control and status information preserved or buffered, the common pin set can be released from use by the second external storage device and again used by the first external storage device to resume the first DMA transfer. The resumption of the first DMA transfer can occur upon completion of the transfer set-up portion of the second DMA transfer, or when the second external storage device enters seek mode, or when the common pin set is idle, or when a predetermined amount of time has passed, or when a predetermined amount of data has been transferred to the second external storage device.

In accordance with yet another embodiment of the present invention, a multiplexed interface controller is provided for servicing dual IDE channels over a common pin set. The interface controller includes a system bus for receiving DMA data and transfer commands. The interface controller also includes an ATA bus pin set for transferring data to or from external IDE devices. In addition, the interface controller includes an ATA bus interface coupled between the system bus and ATA bus pin set. In the ATA bus interface, a primary channel transfer unit initiates a first DMA transfer over the ATA bus pin set to a first external IDE device. After the ATA bus interface receives a request for a second DMA transfer, a bus control circuit in the ATA bus interface terminates the first DMA transfer, releases the ATA bus pin set from the first external IDE device and initiates a second DMA transfer over the ATA bus pin set to a second external IDE device. At a predetermined point during the second DMA transfer, the bus control circuit releases the ATA bus pin set from the second external IDE device and resumes the first DMA transfer. After completion of the first DMA transfer, the second DMA transfer resumes and is completed. In this way, the multiplexed interface controller exploits bus idling events within the first and second DMA transfers to increase the overall throughput over the common pin set. Where the external IDE devices include local high speed memory, the interface controller may transfer additional data as part of the DMA transfers, including at least the IDE device register write commands and/or additional data.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An apparatus and method is described which provides a system for processing multiple input signal streams to decode, deliver, store and/or display multiple audio-video programs simultaneously. The single integrated system includes multiple digital receivers, a data transport processor for processing multiple transport streams into encoded audio and video streams, an MPEG audio-video decoder for decoding multiple transport streams, a microprocessor, an interface to an external memory having a unified memory architecture and integrated display controllers for displaying the decoded audio and video on multiple independent monitors. Clock signals for the system are generated with external voltage controlled crystal oscillator controlled by PWM waveforms. Alternatively, system clock signals and other clock frequencies are synthesized by an integrated set of phase lock loop circuits controlled by program clock recovery control words extracted from the transport stream. In addition, the system includes an interface for controlling the multiplexed transfer of data for multiple channels to hard disk drive storage over a shared or common set of input/output pins.

Figure 1:
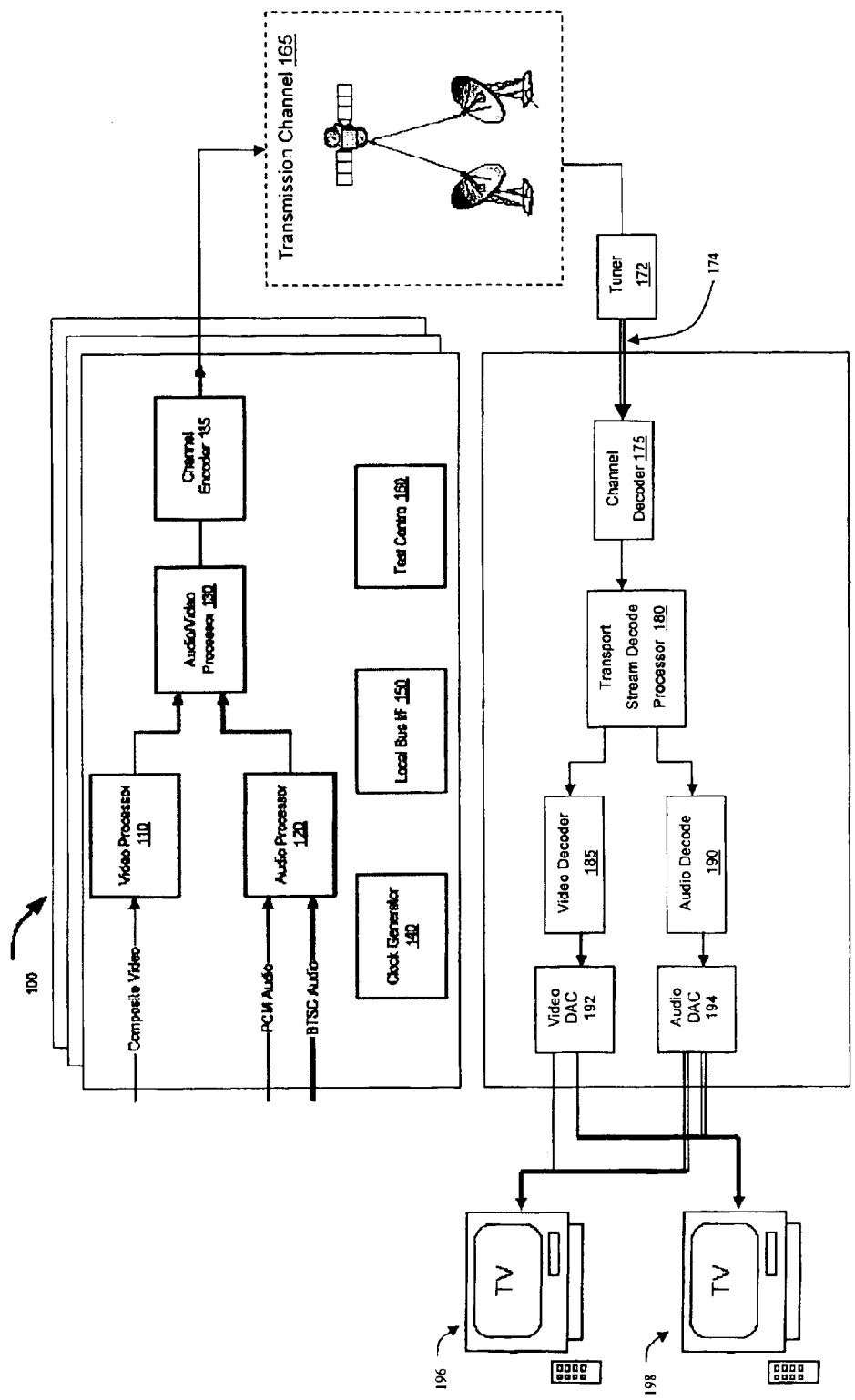
FIG. 1 depicts an overall block diagram illustrating a communications network in accordance with a selected embodiment of the present invention.

The present invention is illustrated with reference to the video decoding system illustrated in FIG. 1, though the IDE channel multiplexing aspects described herein may also be used in other applications where data transfer to external storage devices over a shared output. However, as illustrated in FIG. 1, a communication network where one or more encoders 100 transmit multiple signals 174 to a decoder 170 for servicing multiple output signals for simultaneous display on independent display devices 196, 198. As depicted, the present invention is capable of servicing multiple satellite channels. Specifically, it can receive at least two satellite input signals and produce two television output signals. Both of the output signals may be digitally based. The output signals can be displayed on two separate displays 196, 198, or can be displayed together on a single display in a "picture in a picture" mode.

As described below, support for multiple video channels is provided in the transport block 180, the audio decode block 190, the video decoder block 185 and the video digital-to-analog converter block 192. Additional support for two channel decoding and display may be provided in any the graphics block for the video signal (not shown) and the NTSC/PAL/SECAM video encoder block (not shown), and the audio DAC block also supports two audio channels. Further support for simultaneously transferring multiple channels to and from hard drive storage is provided in an IDE host interface which increases system throughput over a common set of input/output pins by multiplexing data transfers through the interface. As used herein, IDE refers to a hard disk drive standard called Integrated Drive Electronics, but also refers to other standards, such as Enhanced Integrated Data Electronics (EIDE). The standard which controls the bus between storage devices and a host processor is known as the Advanced Technology Attachment (ATA) interface standard, or the Advanced Technology Attachment with Packet Interface (ATA/ATAPI) standard.

In the embodiment of the present invention depicted in FIG. 1, decoding system 170 may receive signals 174 from two separate satellite inputs. Alternatively, the integrated circuit may receive multiple channels or programming from a single satellite input. The video and audio decoding components of the integrated circuit (including the transport and audio/video decoding processors and the DACs) operate to service these two channels under control of independently generated clock signals that and each synchronized to the respective program clocks of the channels being decoded. The decoded signals may then be simultaneously displayed on two independent display devices, or may instead by stored in external hard drive devices.

Figure 2:
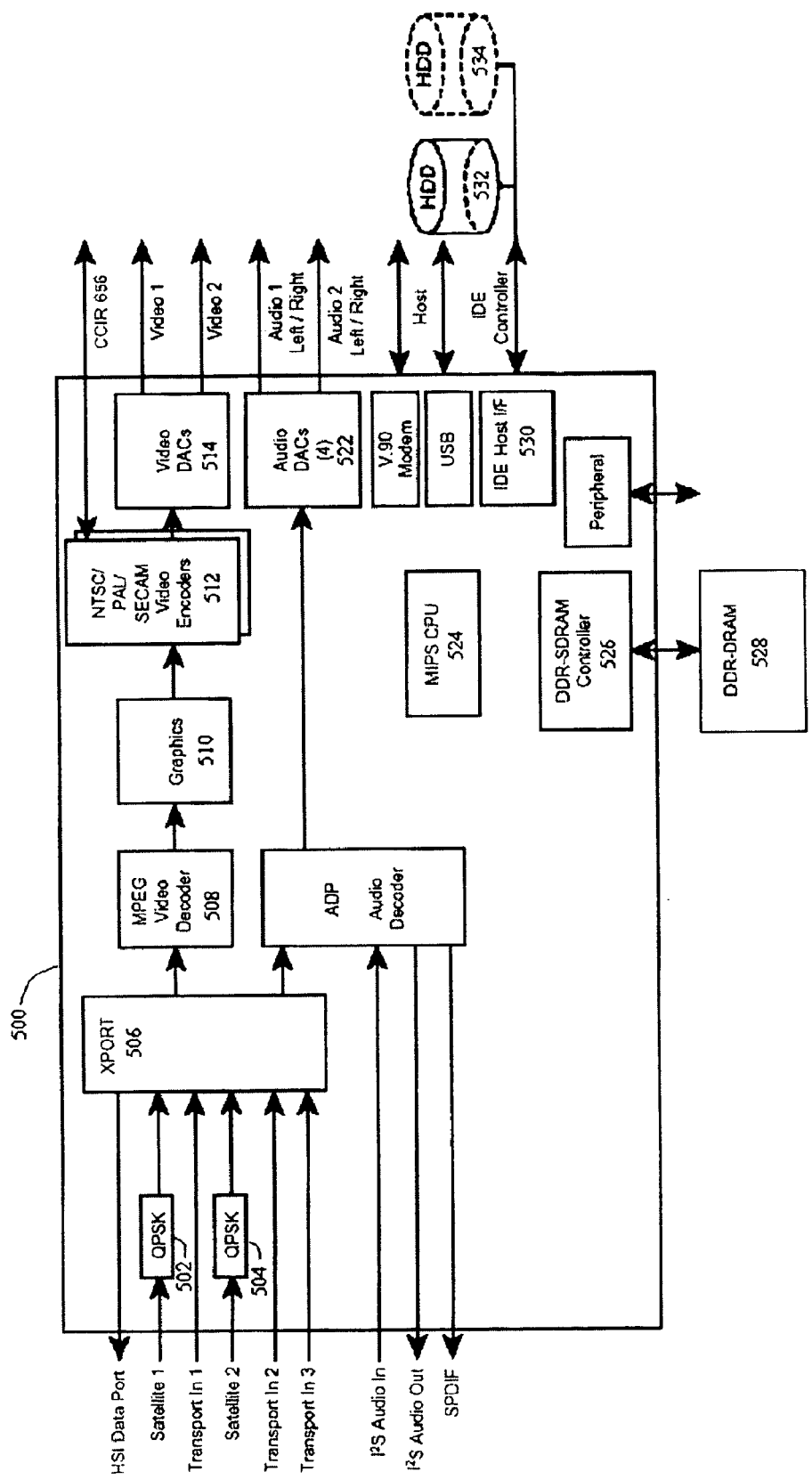
FIG. 2 is a diagram illustrating an embodiment of single chip set top box with dual channel processing and display according to the present invention.

In accordance with the present invention, FIG. 2 illustrates an embodiment of a single chip set-top box system for simultaneously processing and displaying or storing two channels. As shown in FIG. 2, the set-top box system 500 includes integrated all digital receivers 502, 504, for demodulating transport streams, such as satellite signals. Each receiver (e.g., 502) receives a modulated data stream (e.g., Satellite 1) and delivers a demodulated, error corrected output data stream to the data transport processor 506.

Transport processor 506 is capable of simultaneously processing multiple independent transport streams. These transport streams can be selected from three external serial transport stream inputs (shown in FIG. 2 as Transport In 1, Transport In 2, and Transport In 3), from two on-chip receiver channels (output from receivers 502 and 504) or from internal playback channels. The simultaneous processing of five independent transport streams allows MPEG and DirecTV transport streams to be processed concurrently within the transport processor 506. As described herein, transport processor 506 is a transport stream message/PES parser and demultiplexer. In addition, the transport processor 506 supports decryption for up to 64 PIDs in the five streams. All 64 PIDs can be used for output to the video decoder 508 and audio decoder 520, as well as for output to external memory for local recording in memory 528. In addition to supporting multiple independent record and playback channels, the transport processor 506 also provides two PCR recovery blocks for synchronizing the audio/video decode and playback for simultaneous display on multiple independent display devices.

The encoded video stream provided by transport processor 506 is decoded by MPEG video decoder 508. In accordance with the present invention, decoder 508 can simultaneously decode two video streams, whether provided as transport, PES or ES streams. The streams are run-length decoded, inverse quantized and inverse transformed, and then rendered in 4:2:2 video format to provide primary and secondary video feeds.

The encoded audio stream provided by transport processor 506 is decoded by dual MPEG audio decoder 520, which processes up to three audio streams to provide synchronization and filtering. MPEG audio decoder 520 converts the compressed audio data to uncompressed PCM audio data. In a selected embodiment, the uncompressed PCM audio data can be mixed with other PCM audio data stored in memory 528. The final audio data is output through multiple audio DACs 522 to provide left and right audio signals for multiple programs.

As mentioned above, the audio/video decoders 508, 520 may provide decoded data to external memory 528, such as a 32-bit DDR-SDRAM memory subsystem 528. While improvements to memory fabrication technologies have resulted in denser memory chips, memory chip bandwidth has not been increasing as rapidly. The bandwidth of a memory chip is a measure of how fast contents of the memory chip can be accessed for reading or writing. As a result of increased memory density without necessarily a commensurate increase in bandwidth, in many conventional system designs multiple memory devices are used for different functions, and memory space in some memory modules may go unused or is wasted. Accordingly, a unified memory architecture may advantageously be used in connection with the present invention. In the unified memory architecture, all the tasks (also referred to as "clients"), including CPU, display engine and I/O devices, share the same memory. The unified memory architecture preferably includes a memory that is shared by a plurality of devices, and a memory request arbiter coupled to the memory, wherein the memory request arbiter performs real time scheduling of memory requests from different devices having different priorities. The unified memory system assures real time scheduling of tasks, some of which do not inherently have pre-determined periodic behavior and provides access to memory by requesters that are sensitive to latency and do not have determinable periodic behavior.

In addition, data may be stored in hard disk storage under control of the IDE host interface controller 530 which sequences the data transfer activities for multiple channels so that multiple channels can be transferred to/from multiple disk drives 532, 534 over shared pins.

In selected embodiment of the present invention, the IDE host interface controller 530 exploits one of the main bottlenecks in the DMA data transfer process, the seek time of the drive, which is the time it takes to find the starting point on the disk of the data to be transferred. The seek time of standard IDE hard drives can be on the order of several milliseconds. The host processor issues IDE device register write commands to program the starting location and transfer size, and the ATA bus remains idle until the IDE device is able to seek to the desired location. To maximize the average data rate over shared ATA bus pins, the IDE host interface controller 530 initiates the seek operation for the secondary channel to/from the secondary hard drive 534 while the primary DMA transfer to/from the primary hard drive 532 is still in progress.

As depicted in FIG. 2, unified memory 528 and an associated memory controller 526 service an integrated circuit that receives, decodes and outputs multiple channels in a satellite signal. A single memory is advantageously used for the storage of video and audio information from the multiple channels by having the memory controller 526 properly reference the video images from the two or more channels. In addition, controller 526 may include and a 16-bit DDR interface option for lower end applications. In accordance with the present invention, multiple decoded video and audio streams may be simultaneously stored in memory 528 or played back from memory 528.

In a single chip integrated circuit embodiment of the present invention for decoding and displaying multiple satellite signals, dual digital satellite receivers 502, 504 accept two modulated data streams (e.g., "Satellite 1" and "Satellite 2") at up to 90 Mbps. Each integrated receiver (e.g., 502) delivers demodulated, error-corrected output data streams to the transport processor 506. In one embodiment, each receiver (e.g., 502) includes accepts analog baseband I and Q input signals, samples these signals with dual A/D converters, digitally mixes the sampled signals with a variable rate BPSK/QPSK/offset QPSK receiver, and then performs error correction to generate the output signal in transport format.

The data transport processor 506 receives and processes multiple transport streams to parse the message and PES information and to demultiplex the audio and video streams that are provided the video decoder 508 and audio decoder 520. In accordance with an embodiment of the present invention which simultaneously processes two transport streams, transport processor 506 can simultaneously process 64 PIDs in up to five independent transport streams, with decryption for all 64 PIDs. In addition, transport processor 506 supports message/PES parsing for 64 PIDs with storage to 64 external DRAM buffers, and provides 64 section filters. The transport processor 506 also supports personal video recording using three record channels and four playback channels, and further provides a high-speed transport output or a two-channel remux output.

The MPEG video decoder 508 performs MPEG video decoding on two video streams which may be accepted from transport streams, PES streams or ES streams. After performing MPEG decoding functions, decoded video is rendered and provided as an output to graphics engine 510 in 4:2:2 format. The graphics engine 510 accepts dual decoded MPEG video data and performs professional quality compositing of text and graphics with video. The resulting signal is provided to a video display engine consisting of NTSC/PAL/SECAM video encoder 512 and video DAC 514. The video display engine generates dual video output signals for display on two televisions displays 196, 198.

As illustrated above, the present invention supports data storage and retrieval from multiple channels over an ATA bus interface by terminating an ongoing DMA transfer and allowing the opposite channel to program the device registers. Persons skilled in the art will understand that termination of a data transfer does not mean that the data transfer is finished or completed, but instead refers to a temporary break in the data transfer process which can be resumed after the break or at some predetermined event. With the present invention, the maximum throughput of the 2-channel system with shared ATA bus pins can be significantly increased relative to a system where the channel that gains control of the ATA bus maintains control until the DMA transfer is completed. By making the data transfer termination and restart procedures under hardware control, the system can use standard 2-channel software drivers without modification.

Figure 3:
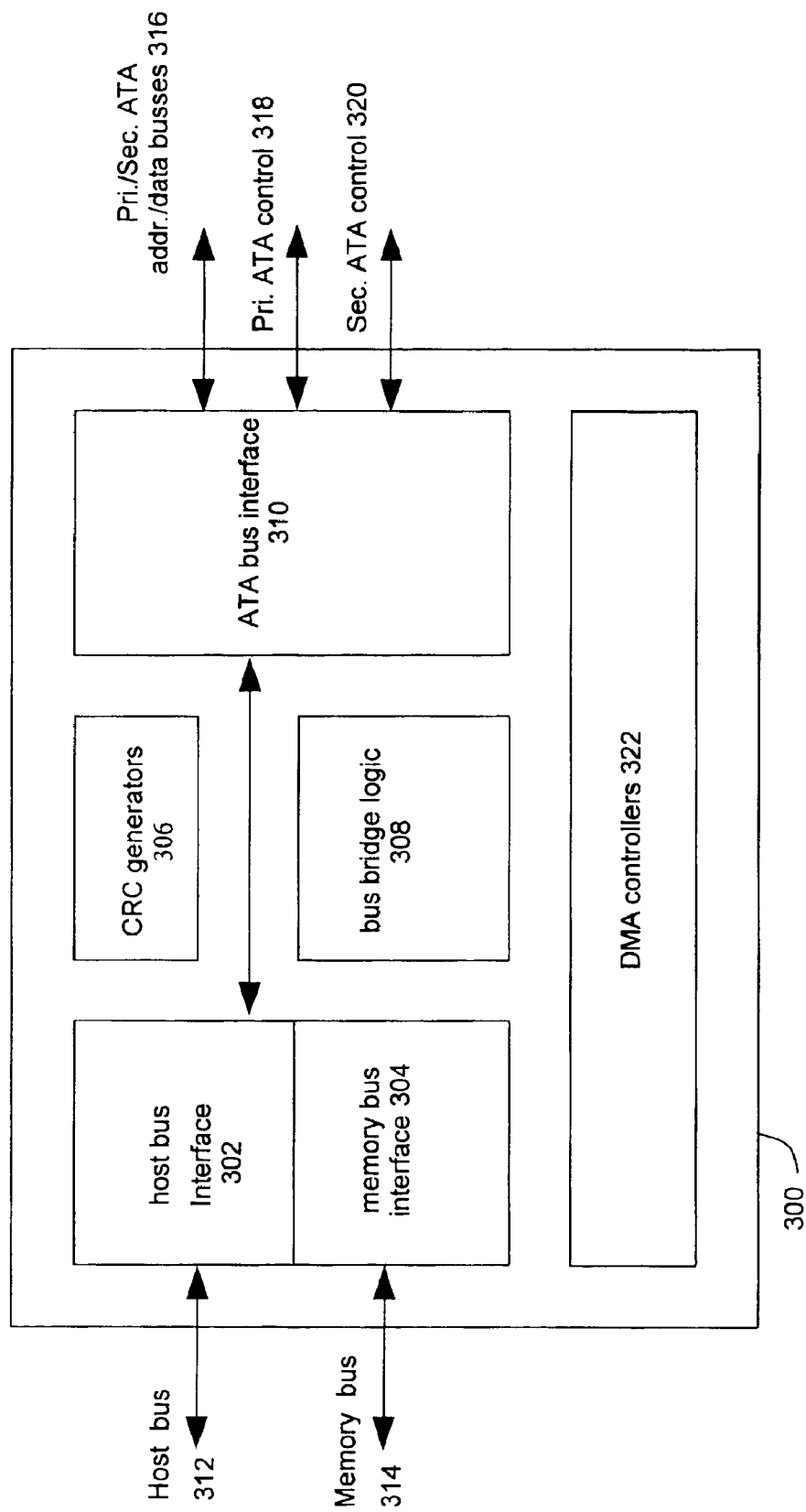
FIG. 3 is a functional block diagram illustrating an IDE host interface for processing two channels according to the present invention.

FIG. 3 depicts a functional block diagram of an IDE host interface for processing two channels according to the present invention. As shown in FIG. 3, the IDE host interface 300 is a two channel (primary and secondary) ATA host adapter that conforms to the AT Attachment with Packet Interface (ATA/ATAPI-5) specification. The IDE host interface 300 acts as a bus bridge between the internal local bus 312 and the external ATA buses 316 to support programmed I/O (PIO) data transfer. The depicted IDE host interface 300 also includes a memory bus interface 304 connecting to system memory. Data from system memory may be transferred to either the primary or secondary IDE devices via the bus interface 310. DMA controller 322 provides support for legacy multiword DMA as well as ultra-DMA data transfer protocols. Cyclic redundancy check (CRC) generator 306 performs CRC checks for ultra-DMA transfers in compliance with the ATA/ATAPI-5 specification. To reduce pin count, the design shares single ATA address, data, and chip select busses between the primary and secondary channels.

As described herein, the present invention provides for the sharing of the bus 316 by buffering or storing the transfer parameters and status information of one channel while the second channel obtains temporary control of the bus 316. In a selected embodiment, when bus interface 310 is servicing a first channel transfer to a first IDE device, the interface 310 handles a request for a secondary channel transfer to a second IDE device by suspending or temporarily terminating the first channel transfer. The secondary channel then gains control of the shared ATA bus so that IDE device register write commands can be issued to the secondary IDE device, after which time the bus 316 is switched back to servicing the first channel transfer. By buffering or storing the transfer parameters and status information of the primary channel prior to suspension, the primary transfer may be resumed after the register write commands are issued for the secondary channel. In this way, the secondary IDE device is able to seek to the desired location while the primary IDE device is continuing with the primary channel transfer, thereby increasing throughput over the shared bus 316.

Figure 4:
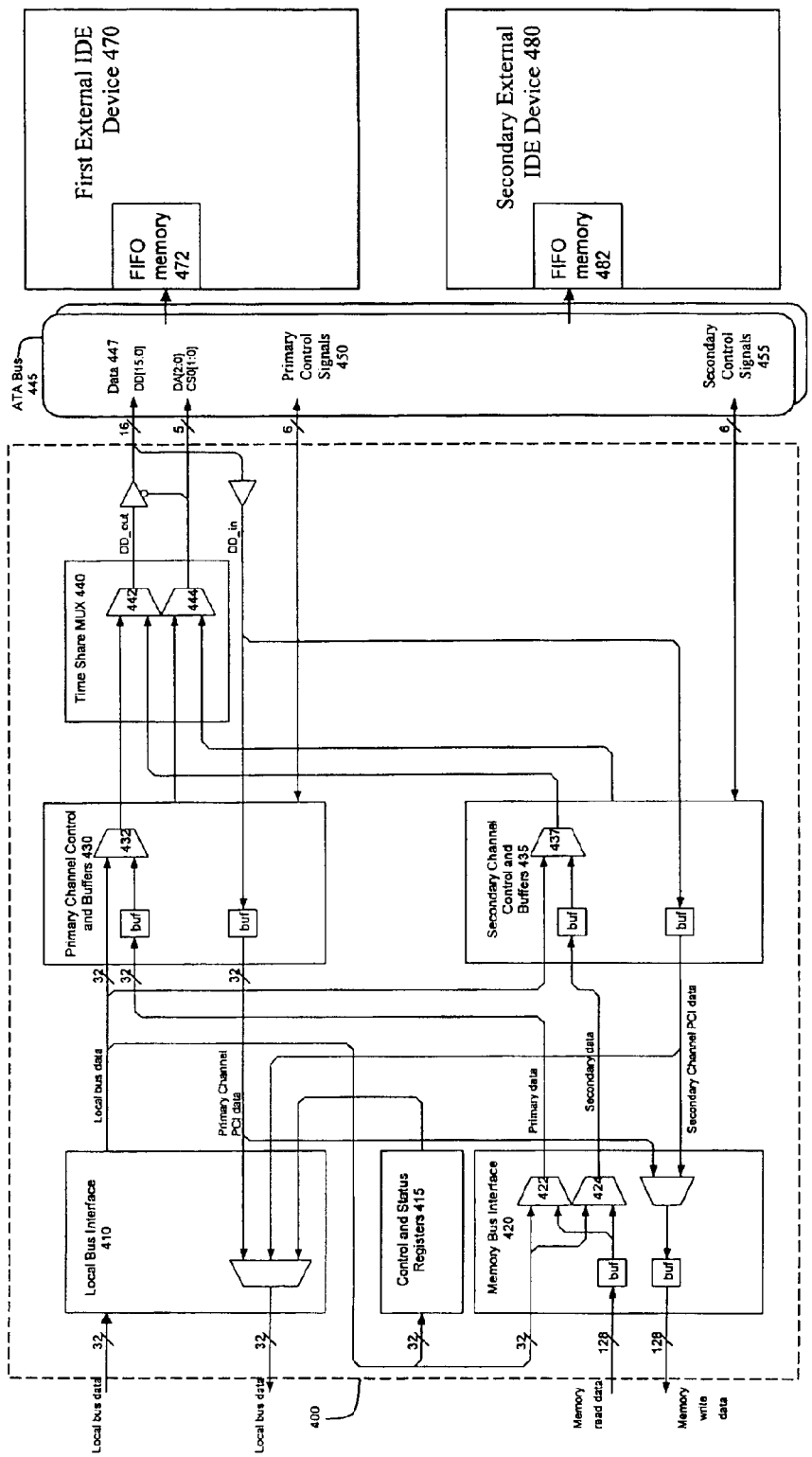
FIG. 4 is a data flow diagram illustrating the operation of the IDE host interface according to the present invention.

In accordance with the foregoing, FIG. 4 shows a data flow diagram illustrating the operation of the IDE host interface 400 according to the present invention. As shown in FIG. 4, data from the local bus is transferred to the host interface 400 under control of the system host (not shown) and received at the local bus interface 410. Host interface 400 also receives data from system memory at the memory bus interface 420. To support multiple channel transfers, the present invention provides multiple control and data buffer units for receiving and holding data channels to be transferred over the ATA bus 445. For example, the dual channel transfer configuration depicted in FIG. 4 shows a primary channel control and data buffer unit 430 and secondary channel control and data buffer unit 435, each of which is coupled to receive data from the local bus interface 410 and the memory bus interface 420. In addition, each channel buffer unit receives control and status signals for each channel transfer. For example, DMA transfer parameters may be provided by the host (not shown) and stored in the control and status registers unit 415 and/or distributed through the memory bus interface 420 to the primary channel control and data buffer unit 430 and secondary channel control and data buffer unit 435.

Whether stored in the control and data buffer units 430, 435 or the control and status registers unit 415, transfer parameters and transfer status information are stored within the host interface 400 for each channel under transfer. In addition, the transfer parameters and status information may also be written to the associated external IDE device 470, 480, as will be appreciated by those skilled in the art.

As illustrated in FIG. 4, each control and data buffer unit 430, 435 is coupled to the ATA bus through a time share multiplexer circuit 440. In particular, primary channel control and data buffer unit 430 is coupled to provide data and address to the time share multiplexer 440. As shown, the data may be selected by selection circuit 432 which multiplexes local bus data from the local bus interface 410 and primary data from the memory bus interface 420. Similarly, selection circuit 437 within the secondary channel control and data buffer unit 435 multiplexes data from the local bus interface 410 and secondary data from the memory bus interface 420 to provide secondary channel data and address to the time share multiplex circuit 440. In a selected embodiment, control and data buffer units 430, 435 are configured to retain transfer parameter and status control information so that a channel transfer through the buffer may be temporarily suspended or terminated and then subsequently resumed to complete the channel transfer. As a result, each channel buffer generates data and associated control words which may be selectively applied to the interface bus 445 in a time-shared manner.

In support of data transfers from the external IDE devices 470, 480 through the host interface 400, FIG. 4 also depicts the flow of data and control words for primary and secondary channels through the primary and secondary channel buffers 430, 435. Depending upon whether the data is to be transferred to the local bus or memory bus, the local bus interface 410 and memory bus interface 420 selectively direct the primary and secondary data signals from the channel buffers 430, 435 to the appropriate system bus.

Figure 5:
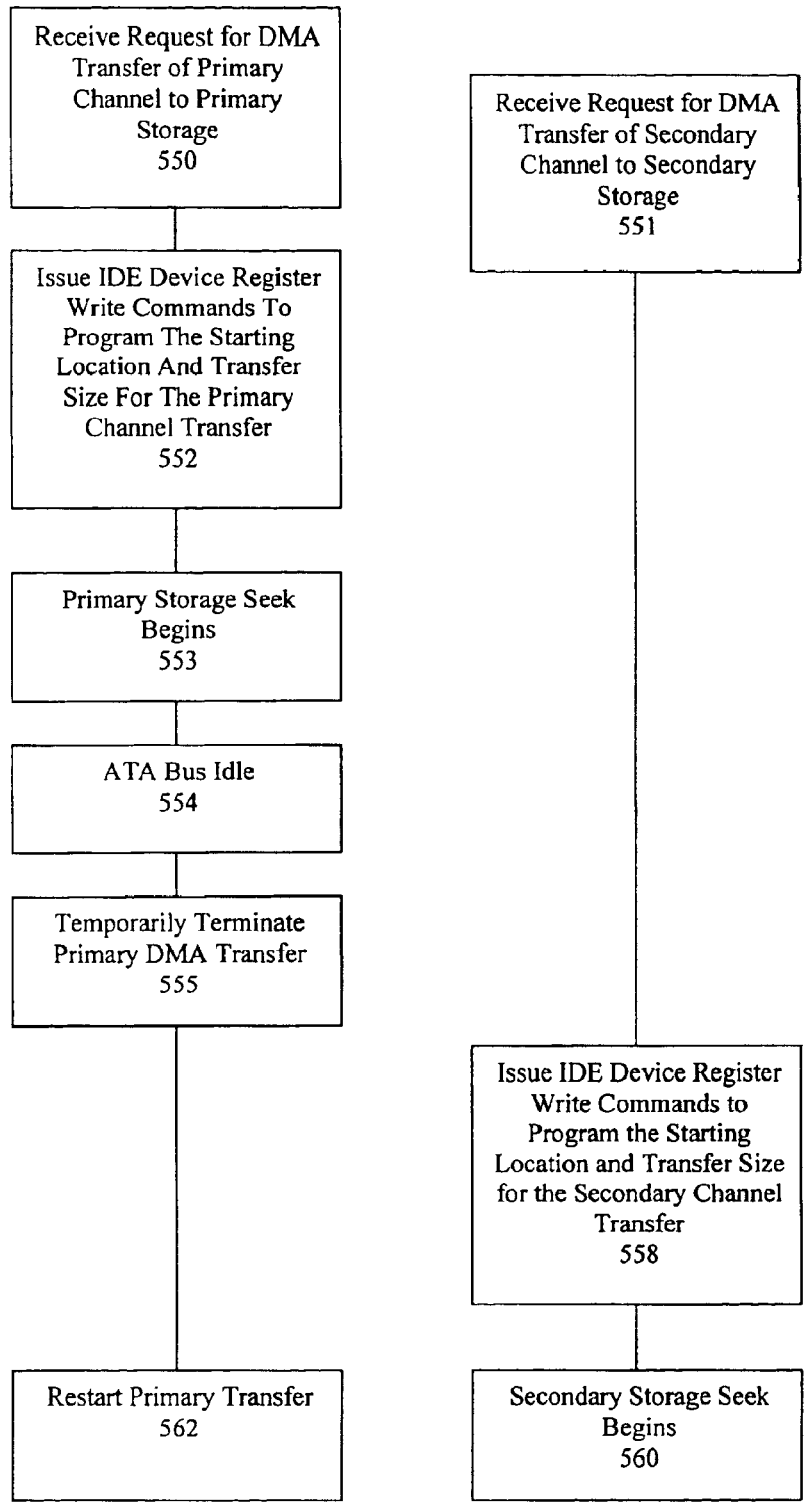
FIG. 5 is a flow chart illustrating a method of multiplexing hard drive data transfers over shared pins in accordance with an embodiment of the present invention.

As illustrated in FIG. 5, the IDE host interface controller multiplexes channel transfers to/from hard drive storage over common pins by allowing the secondary (primary) channel to seek while a primary (secondary) DMA transfer is in progress. In the embodiment illustrated in FIG. 5, first and second drive transfer requests are received, as indicated at blocks 550 and 551. It will be appreciated that the specific sequencing of when the requests are received is not important, since the present invention applies whenever there are overlapping drive transfer requests in the sense of a second request being received before the first request is serviced.

For purposes of the embodiment depicted in FIG. 5, the first request for data transfer, such as a direct memory access (DMA) request, is serviced at step 552. For example, IDE device register write commands are issued to program the starting location and size for the DMA transfer. The first storage device implicated by the first request for data transfer performs a seek operation to find the starting point on the disk of the data to be transferred. As shown, when the seek operation occurs (at step 553), the ATA bus is idle (block 554). But even if the primary DMA transfer of the first channel transfer has begun, the IDE host adapter hardware may temporarily terminate the primary DMA transfer to the first storage device (step 555), freeing the ATA bus to allow the secondary channel IDE device register write commands to issue at step 558. Thus, the data transfer parameters are programmed for a secondary DMA transfer to a second storage device, at which time the seek operation on the secondary storage device begins (at step 560). Once the secondary seek begins, the ATA bus is again freed so that the host adapter hardware can then restart the terminated primary DMA data transfer at step 562. In this way, the secondary channel device can be seeking while the primary DMA data transfer is still in progress.

In accordance with a further embodiment, the sequencing of primary/secondary ATA bus control may be arranged to make dual use of the seek operations of the external IDE devices. With reference to the example depicted in FIG. 5, if two channel transfer requests are pending or queued, the register write commands for the second channel transfer can be issued simultaneously with the seek operation for the first channel transfer operation, during which time the ATA bus is idle (step 554). In this way, the register write commands are written to the second IDE device while the first IDE device is seeking, and then while the ATA bus switches back to service the primary channel transfer to the first IDE device, the second IDE device is seeking.

In accordance with the present invention, the register write commands specifying the data transfer parameters may be first transferred to local memory located within the external IDE device. If the specified transfer is a hard drive read operation, then the second IDE device may begin transferring data from disk to the IDE device local buffer, even though the second IDE device is no longer connected to the ATA bus.

Additional efficiencies and higher throughput are obtained by using burst transfer techniques to transfer additional information to local FIFO memory located at the external IDE device. For example, when a first channel is suspended to permit the ATA bus to connect to the second IDE device, the duration of the suspension may be selected to permit transfer of not only the register write commands to the second IDE device, but also at least part of the data that is to be transferred to the second IDE device. By holding any transferred data in the FIFO memory, the second IDE device can begin data transfer from the FIFO to the disk once the seek operation is completed, even though ATA bus is not connected to the second IDE device.

Figure 6A:
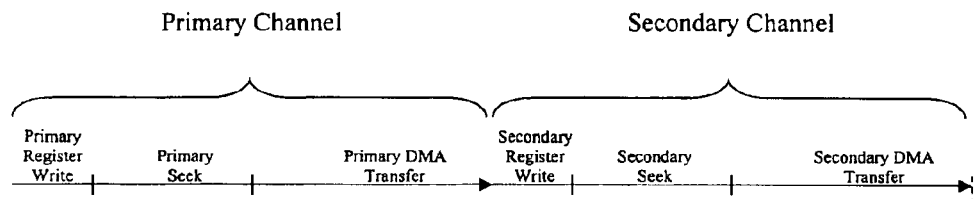
FIG. 6 is a time line illustration of how multiple channels are transferred over a common bus to obtain improved throughput.

FIG. 6 is a timeline illustration of how multiple channels are transferred over a common bus to obtain improved throughput. FIG. 6a shows the conventional approach for sharing of the ATA bus pins between two channel transfers wherein a first channel is given exclusive access to the ATA bus until the first DMA data transfer is finished, after which time the second channel is given exclusive access to the ATA bus. In the example depicted in FIG. 6, the present invention takes advantage of the external IDE device activities which do not require use of the ATA bus.

In particular and as shown in FIG. 6a, a typical transfer consists of three stages. In the first stage (e.g., Primary Register Write), IDE device register write commands are issued to the primary external IDE device. After the register write commands are issued, the primary external IDE device performs a seek operation (e.g., Primary Seek) to find the starting point on the disk of the data to be transferred. The seek time of standard IDE hard drives can be on the order of several milliseconds. During seek, the ATA bus remains idle until the IDE device is able to seek to the desired location. Once the location is reached, the DMA transfer of data from the external IDE device occurs (e.g., Primary DMA Transfer). These stages are shown in FIG. 6a, which also illustrates how two channel transfers are performed in sequence under the conventional approach of giving exclusive control of an ATA bus to a channel for the duration of its DMA data transfer.

Figure 6B:
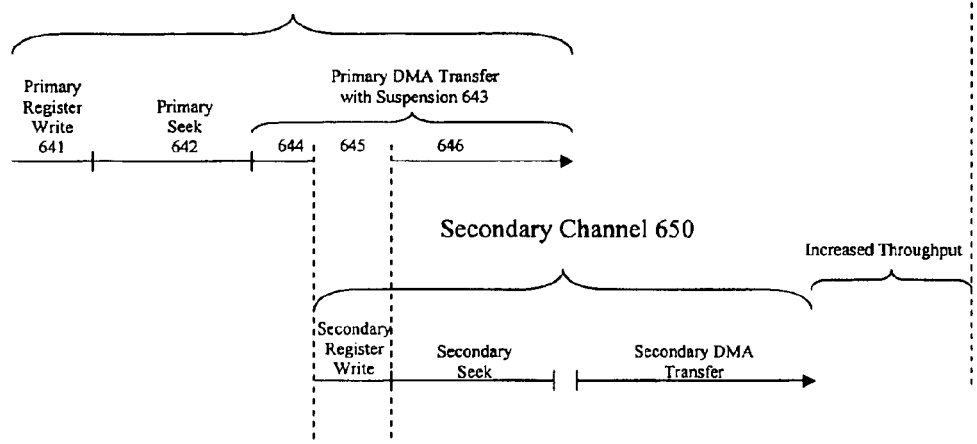

In accordance with the present invention, FIG. 6b illustrates how the primary and secondary channel transfers can be multiplexed, taking advantage of the ATA bus inactivity. For example, if a primary channel transfer 640 is underway such that the primary DMA transfer 644 has already started and the host interface receives a request for a secondary channel transfer 650, the interface controller temporarily suspends or terminates the primary channel transfer 645 to permit the ATA bus to switch to the external IDE device for the secondary channel transfer. After the register write commands for the secondary channel are written to the secondary IDE device 651, the ATA bus resumes the DMA transfer operations for the primary channel 646. Simultaneously with resumption of the primary DMA transfer, the secondary external device proceeds with seek operation 652 to locate the starting point for the secondary channel transfer. In this way, operations of the first and second external IDE devices are overlapped. Upon completion of the DMA transfer for the primary channel 646, the ATA bus switches back to the secondary IDE device to process the secondary DMA transfer 654.

As will be appreciated, when writing the transfer parameters to a second device while a first DMA transfer is ongoing, each register write in the sequence may require a separate termination procedure. Alternatively, all register writes could be done during one termination.

Figure 6C:
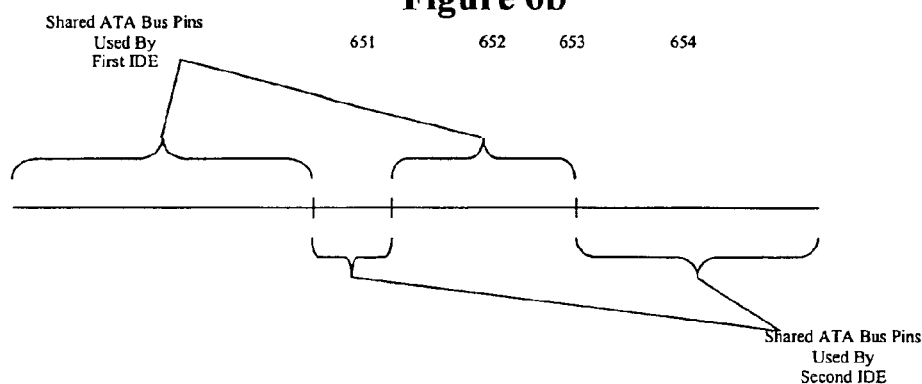

As a result, the primary and secondary channel transfers are completed in a shorter amount of time (as shown in FIG. 6b) than if the two transfers were performed in sequence (as shown in FIG. 6a). In addition, the multiplexing of the primary and secondary channels is accomplished over a shared or common set of ATA bus pins. As shown in FIG. 6c, the first device has access to the shared ATA bus during the primary channel transfer up until a point when a secondary channel transfer request is made. At this juncture, the second IDE device gains access to the bus for purposes of transferring one or more of the register write commands for the secondary channel. Upon completion, the first transfer is restarted to service the remaining portion of the primary DMA transfer.

Though the secondary DMA transfer is illustrated in FIG. 6b as beginning upon completion of the first DMA transfer, it will be appreciated that the present invention may advantageously be implemented by selectively granting control of the shared ATA bus to the first and second external IDE devices. The additional time multiplexing of the DMA transfers can impose additional overhead requirements for terminating and restarting each transfer, the overall throughput may be nonetheless increased.

As will be appreciated, suspension or temporary termination of a channel transfer requires that transfer parameters and control status information be maintained at the host interface and/or the external IDE device to permit data transfer operations to resume after the suspension or termination. By retaining transfer status information at the IDE interface controller, a channel transfer may be resumed without having to re-start the channel transfer over again.

The present invention accomplishes additional embodiments beyond those depicted in FIG. 6. For example, if two channel transfer requests are received at the same time or are queued together, the ATA bus may be switched from the first IDE device to the second IDE device while the first IDE device is performing seek operations. As a result, the ATA bus, which would otherwise be idle during the seek operation for the primary channel transfer, is used to transfer register write commands to the secondary IDE device before switching back to complete the primary channel transfer. In this way, additional increased throughput is provided without the requirement of suspending or terminating the primary channel transfer operation.

With reference to the embodiment illustrated in FIG. 4, the entire ATA bus 445 need not be shared between the primary and secondary channels. For example, persons skilled in the art will appreciate that selected control signals 450, 455 are separate for each channel, and only the data, address and chip select lines 447 are shared. Some, if not all, of these control signals must be separate as they are involved in the transfer termination and restart processes. In accordance with the ATA specification, persons skilled in the art will also appreciate that each channel may comprise two devices, a master and slave, for a total of four devices in the dual channel embodiment. In a selected embodiment, no termination and restarting is allowed between master and slave on the same channel.

Figure 7A:
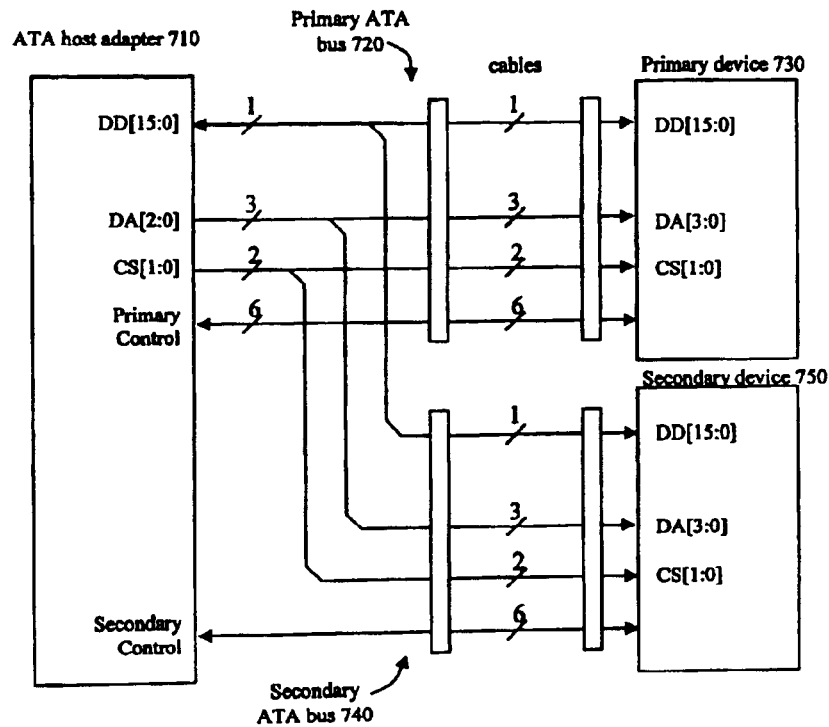
FIG. 7 illustrates how shared pins are may be tied or connected by an isolation switch to the primary and secondary ATA busses (cables) in accordance with the present invention.

In accordance with the present invention, the shared pins are not necessarily switched so that they are connected and disconnected to the primary and secondary ATA busses (cables). For the lower speed DMA modes, the ATA host adapter busses may be tied together. For example and as illustrated in FIG. 7a, for the lower speed DMA modes (LDMA modes and UDMA modes 0–2), the common pins can be wired directly to both ATA busses. Such a configuration is in accordance with the ATA-5 specification. In particular, the data bus portion of the shared pins DD[15:0] and the address DA[2:0] and chip select CS[1:0] signals from ATA host adapter 710 can be wired directly to both primary and secondary ATA busses 720, 740 for LDMA and UDMA modes.

Figure 7B:
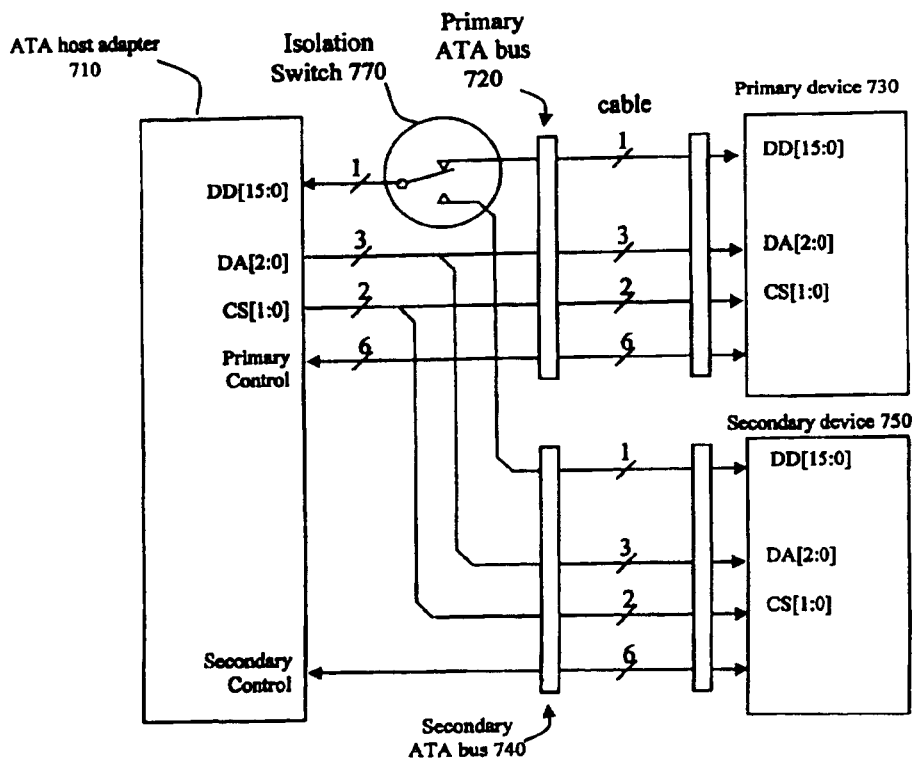

In accordance with the present invention, the shared pins may also be switched so that they are connected and disconnected to the primary and secondary ATA busses (cables), an embodiment which is particularly useful for the ATA-5 specification requirements for high speed DMA modes (UDMA modes 3–4). For example and as illustrated with reference to FIG. 7b, the primary and secondary data busses are electrically isolated. This isolation can be accomplished with the use of external switches or bus transceivers, such as isolation switch 770 depicted in FIG. 7b. As depicted, the address DA[2:0] and chip select CS[1:0] signals from ATA host adapter 710 can be wired directly to both primary and secondary ATA busses 720, 740; however, the data bus portion of the shared pins DD[15:0] are effectively connected and disconnected from the ATA busses 720, 740 for systems using UDMA modes 3–4 by switches 770 that are external to the chip on which host adapter 710 is located.

Figure 8A:
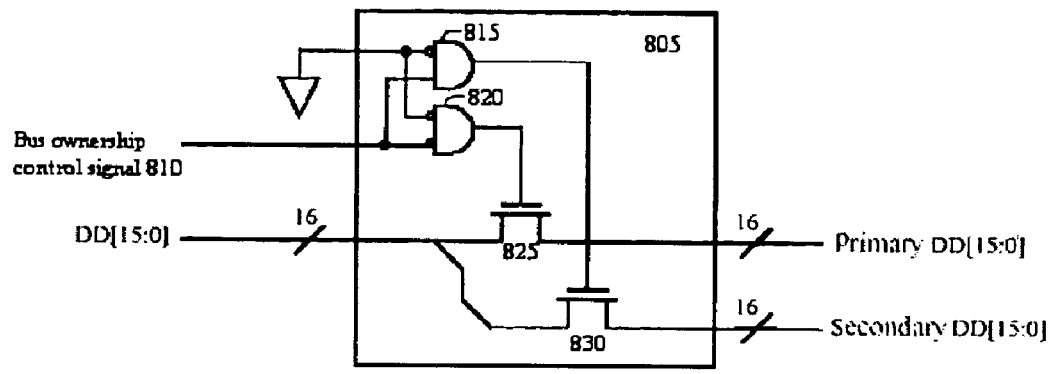
FIG. 8 depicts external ATA data bus switch/transceiver configurations for use with the present invention.

While persons skilled in the art will appreciate that a variety of switches or bus transceivers will provide electrical isolation of the primary and secondary ATA data busses during high speed DMA operation, FIG. 8 depicts two external ATA data bus switch/transceiver configurations for use with high speed ATA bus switching. As shown with the bus switch 805 depicted in FIG. 8a, a control signal 810 from the ATA bus interface output signals which channel has bus ownership by enabling logic gates 815, 820 to select either the primary switch 825 or the secondary switch 830 for passing the data from the ATA bus interface to the primary or secondary bus. While other logic gate configurations can be used, the bus switch 805 couples two AND gates between switches 825, 830 and the bus ownership control signal 810. Each AND gate includes an inverted input from a reference voltage, and the other input is the bus ownership control signal 810 which is applied directly to gate 815 and applied as an inverted signal to gate 820.

Figure 8B:
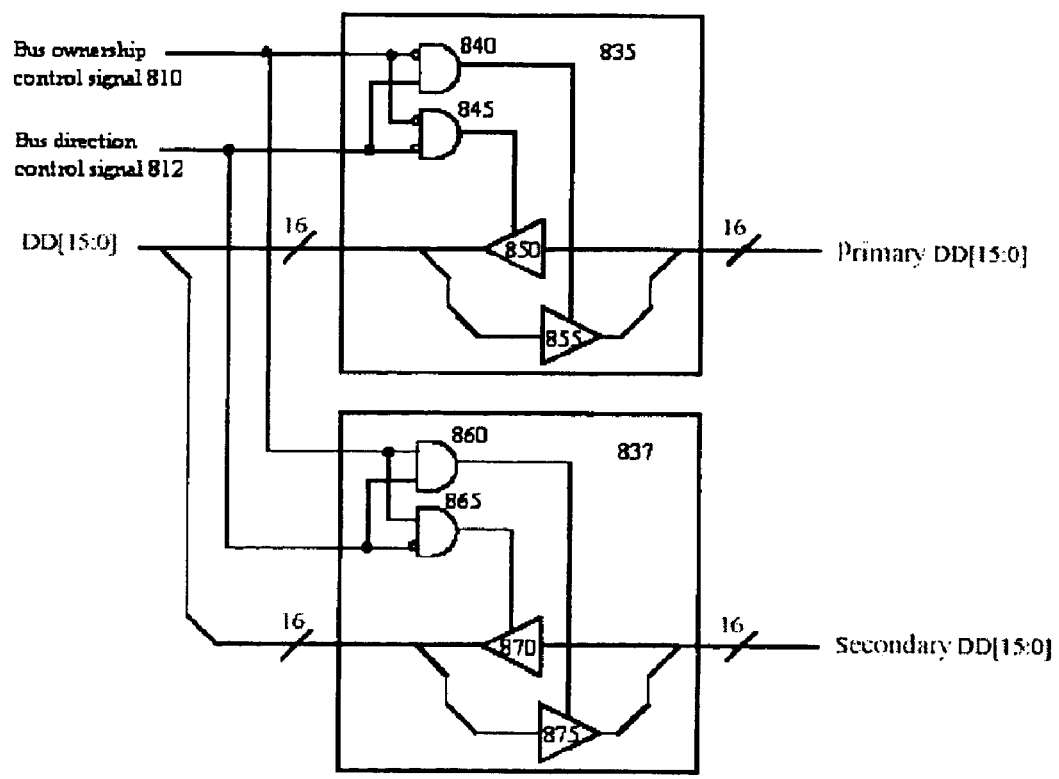

FIG. 8b depicts an alternate embodiment for providing switching isolation with an transceiver configuration, where each channel includes its own transceiver switch 835, 837. As illustrated with the transceiver switch 835 depicted in FIG. 8b, a control signal 810 from the ATA bus interface output signals which channel has bus ownership by enabling logic gates in transceiver switches 835, 837 to select either the primary transmission buffer 855 or the secondary transmission buffer 875 for passing the data from the ATA bus interface to the primary or secondary bus. A second control signal 812 from the ATA bus interface output signals the bus direction for the transceiver 835, 837. In the circuit configuration depicted in FIG. 8b, transceiver 835 transmits when the bus direction control signal 812 is set to "1" and receives when set to "0."

In accordance with the foregoing, a secondary channel performs seek operations while the primary channel performs DMA transfer by having the IDE host adapter hardware temporarily terminate the primary DMA transfer, freeing the ATA bus to allow the secondary channel IDE device register writes to program the data transfer parameters. The host adapter hardware can then restart the terminated primary DMA transfer, using the transfer parameters and status control information stored in the host interface. In this way, the secondary channel device can be seeking while the primary DMA data transfer is still in progress. By terminating an ongoing DMA transfer and allowing the opposite channel to program the device registers, throughput of a two channel system with a shared ATA bus can be increased. In addition, when two channel transfer requests are pending, by allowing a second channel to program the device registers while the first channel is performing seek operations, the maximum throughput of such a two channel system with shared ATA bus pins can be restored to nearly the same as that of an independent two channel system.

While the system and method of the present invention has been described in connection with the preferred embodiment, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. An ATA host adapter comprising:
   a first bus interface for receiving first transfer parameters defining a first channel transfer to a first external storage device, for receiving second transfer parameters defining a second channel transfer to a second external storage device and for receiving data to be transferred under control of the first and second transfer parameters;
   a DMA controller for supervising progress of the first channel transfer; and
   an external storage bus interface for multiplexing first and second channel transfers over a common bus by switching the common bus from the first channel transfer to the second channel transfer at a predetermined switching event and then switching the common bus back to complete the first channel transfer under control of the DMA controller, wherein the predetermined switching event is when the common bus is idle during the first channel transfer and a second channel transfer request is pending.

2. The ATA host adapter of claim 1, wherein the predetermined switching event is a request to access device registers on a second channel.

3. The ATA host adapter of claim 2, wherein the external storage bus interface suspends the first channel transfer when the request to access device registers on a second channel is received, allows to one or more device registers for the second channel transfer to be accessed, and then restarts the first channel transfer over the common bus to complete the first transfer.

4. The ATA host adapter of claim 1, wherein the DMA controller includes one or more memory devices for storing transfer parameters and transfer status information for the first channel transfer until the first channel transfer is completed.

5. The ATA host adapter of claim 1, wherein the external storage devices are IDE storage devices.

6. A method for sending or receiving a plurality of DMA transfers over a common pin set to or from a plurality of external storage drives, where each DMA transfer comprises a transfer set-up portion and a data transfer portion, comprising:
   initiating a first DMA transfer over the common pin set to a first external storage device;
   receiving a request for access to one or more of the device registers of a second external storage device on another channel;
   terminating the DMA transfer to the first external storage device and allowing one or more register accesses to the second device on another channel over the common pin set upon occurrence of a first predetermined event, wherein the first predetermined event is receiving a request for a second channel device register access;
   releasing the common pin output set from the second external storage device and resuming the first DMA transfer upon occurrence of a second predetermined event.

7. A method for sending or receiving a plurality of DMA transfers over a common pin set to or from a plurality of external storage drives, where each DMA transfer comprises a transfer set-up portion and a data transfer portion, comprising:
   initiating a first DMA transfer over the common pin set to a first external storage device;
   receiving a request for access to one or more of the device registers of a second external storage device on another channel;
   terminating the DMA transfer to the first external storage device and allowing one or more register accesses to the second device on another channel over the common pin set upon occurrence of a first predetermined event, wherein the first predetermined event is when the first external storage device enters seek mode and a request for a second channel device register access is pending;
   releasing the common pin output set from the second external storage device and resuming the first DMA transfer upon occurrence of a second predetermined event.

8. The interface method of claim 6, further comprising terminating the first DMA transfer when the request for access to a device register on another channel is received.

9. The interface method of claim 6, wherein the second predetermined event is completion of the transfer set-up portion of the second DMA transfer.

10. The interface method of claim 6, wherein the second predetermined event is completion of at least the transfer set-up portion of the second DMA transfer.

11. The interface method of claim 6, further comprising terminating the first external storage device DMA transfer upon completion of the first DMA transfer and completing the second DMA transfer over the common pin output.

12. A multiplexed interface controller for servicing dual IDE channels over a common pin set, comprising:
   a system bus for receiving DMA data and transfer commands;
   an ATA bus pin set for transferring data to and from first and second external IDE devices; and an ATA bus interface coupled between the system bus and ATA bus pin set, comprising:
- a primary channel transfer means for initiating a first DMA transfer over the ATA bus pin set to a first external IDE device;
- a bus control means for terminating the first DMA transfer, releasing the ATA bus pin set from the first external IDE device and initiating at least one device register access to a second channel over the ATA bus pin set; and
- a bus control switchback means for restarting the first DMA transfer upon occurrence of a predetermined event; and,
- means for transferring data over the ATA bus pin set to a remote memory in the second external IDE device as part of a second DMA transfer, wherein the predetermined event is a partial completion of the second DMA transfer.

13. The multiplexed interface controller of claim 12, wherein the predetermined event is completion of transferring IDE device register write commands for the second channel DMA transfer to the second external IDE device.

14. The multiplexed interface controller of claim 12, wherein the bus switching means comprises a primary channel control and data buffer logic for terminating the first DMA transfer and releasing the common ATA bus pin set from the first external IDE device.

15. The multiplexed interface controller of claim 12, wherein the primary channel transfer means transfers IDE device register write commands for the first DMA transfer over the ATA bus pin set to the first external IDE device, and the bus control means initiates a second DMA transfer over the ATA bus pin set once the transfer of the IDE device register write commands for the first DMA transfer is completed.

16. An integrated circuit IDE interface for multiplexing data, address, and chip select lines of the ATA bus so that a plurality of hard drives on different ATA bus channels may be interfaced using the common pins of the integrated circuit, comprising:
- a primary channel controller for supervising a first data transfer to a first hard drive over the common pins; and
- a secondary channel controller for supervising a second data transfer to a second hard drive over the common pins;
- wherein the primary channel controller and secondary channel controller are operable to temporarily suspend the first data transfer, initiate the second data transfer, resume the first data transfer while the second hard drive performs seek operation to find a starting location for the second data transfer and then resume the second data transfer after completion of the first data transfer, wherein the primary channel controller and secondary channel controller are operable to temporarily suspend the first data transfer once register write commands for the first data transfer are transferred to the first hard drive.

17. An integrated circuit IDE interface for multiplexing data, address, and chip select lines of the ATA bus so that a plurality of hard drives on different ATA bus channels may be interfaced using the common pins of the integrated circuit, comprising:
- a primary channel controller for supervising a first data transfer to a first hard drive over the common pins; and
- a secondary channel controller for supervising a second data transfer to a second hard drive over the common pins;
- wherein the primary channel controller and secondary channel controller are operable to temporarily suspend the first data transfer, initiate the second data transfer, resume the first data transfer while the second hard drive performs seek operation to find a starting location for the second data transfer and then resume the second data transfer after completion of the first data transfer, wherein the primary channel controller is operable to temporarily suspend the first data transfer when the second channel controller receives a request for a second data transfer.

* * * * *